United States Patent [19]
Ito

[11] Patent Number: 5,734,510
[45] Date of Patent: Mar. 31, 1998

[54] ZOOM LENS

[75] Inventor: Takayuki Ito, Tokyo, Japan

[73] Assignee: Asahi Kogaku Kogyo Kabushiki Kaisha, Tokyo, Japan

[21] Appl. No.: 755,914

[22] Filed: Nov. 25, 1996

[30] Foreign Application Priority Data

Nov. 29, 1995 [JP] Japan ................................. 7-311206

[51] Int. Cl.$^6$ ................................................. G02B 15/14
[52] U.S. Cl. ............................................. 359/691; 359/692
[58] Field of Search ..................................... 359/646, 676, 359/691–693, 746.5, 765, 688

[56] References Cited

U.S. PATENT DOCUMENTS

| | | | |
|---|---|---|---|
| 5,278,699 | 1/1994 | Ito et al. | 359/692 |
| 5,309,285 | 5/1994 | Ito | 359/692 |
| 5,663,838 | 9/1997 | Hasushita et al. | 359/692 |

*Primary Examiner*—Frank G. Font
*Assistant Examiner*—Michael P. Stafira
*Attorney, Agent, or Firm*—Greenblum & Bernstein P.L.C.

[57] ABSTRACT

A zoom lens includes a front lens group and a rear lens group, which satisfies the relationship defined by the formula $1.07 < Z_x/Z_o$, wherein "$Z_o$" represents a zoom ratio when zooming while keeping an in-focus condition for a most distant object, "$Z_x$" represents a zoom ratio when zooming while keeping an in-focus condition for a closest object, $Z_x = m_L/m_S$, $Z_o = f_L/f_S$, where "$m_L$" represents the lateral magnification of the whole lens system at a long focal length extremity and at a short object distance, "$m_S$" represents the lateral magnification of the whole lens system at a short focal length extremity and the short object distance, "$f_L$" represents the focal length of the whole lens system at the long focal length extremity and at the long object distance, and "$f_S$" represents the focal length of the whole lens system at the short focal length extremity and at the long object distance.

7 Claims, 15 Drawing Sheets

Fig. 4
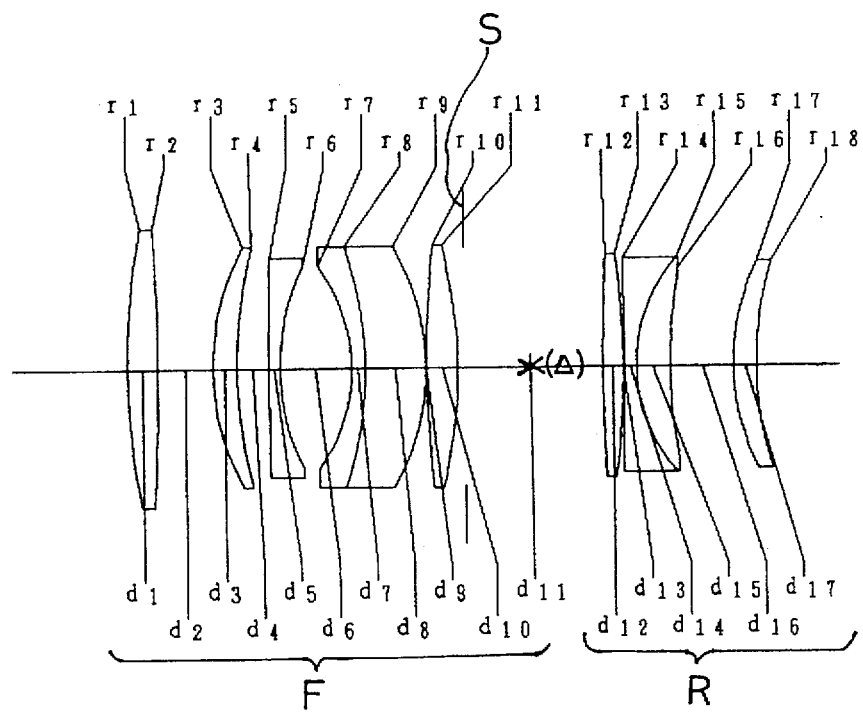
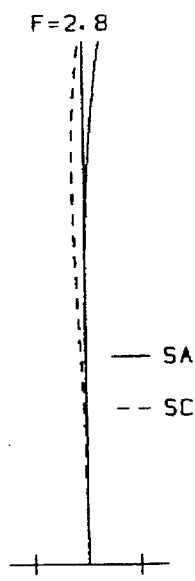
Fig. 5A
Spherical Aberration
Sine Condition
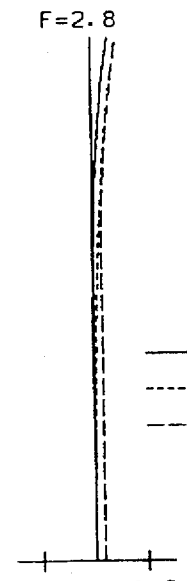
Fig. 5B
Spherical Aberration
Chromatic Aberration
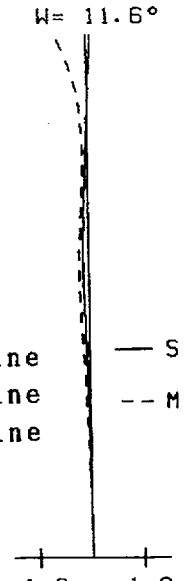
Fig. 5C
Astigmatism
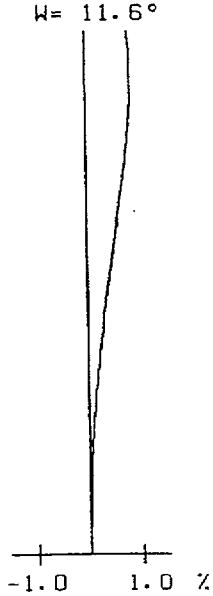
Fig. 5D
Distortion Fig.6
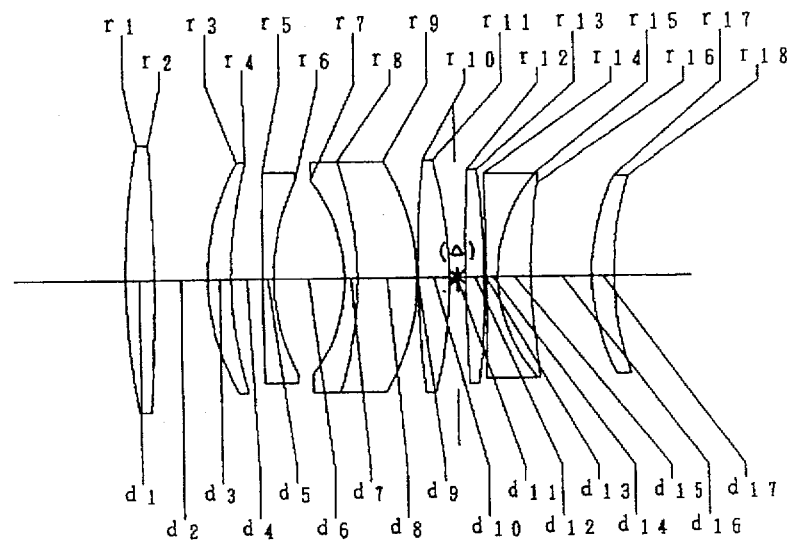
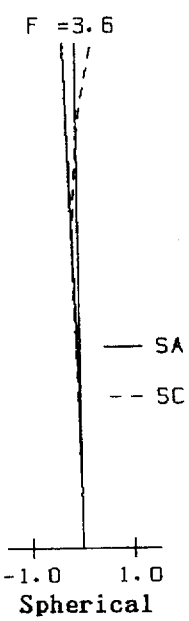
Fig.7A
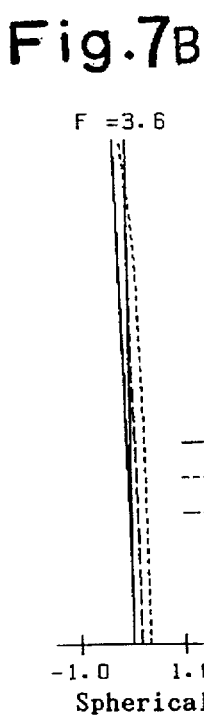
Fig.7B
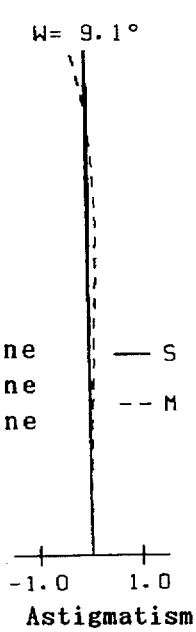
Fig.7C
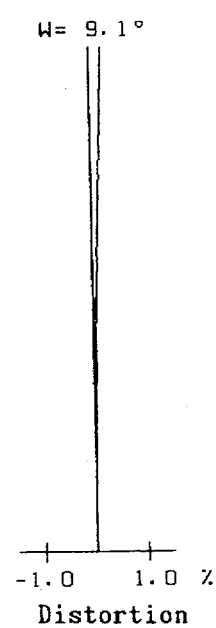
Fig.7D

Fig.8
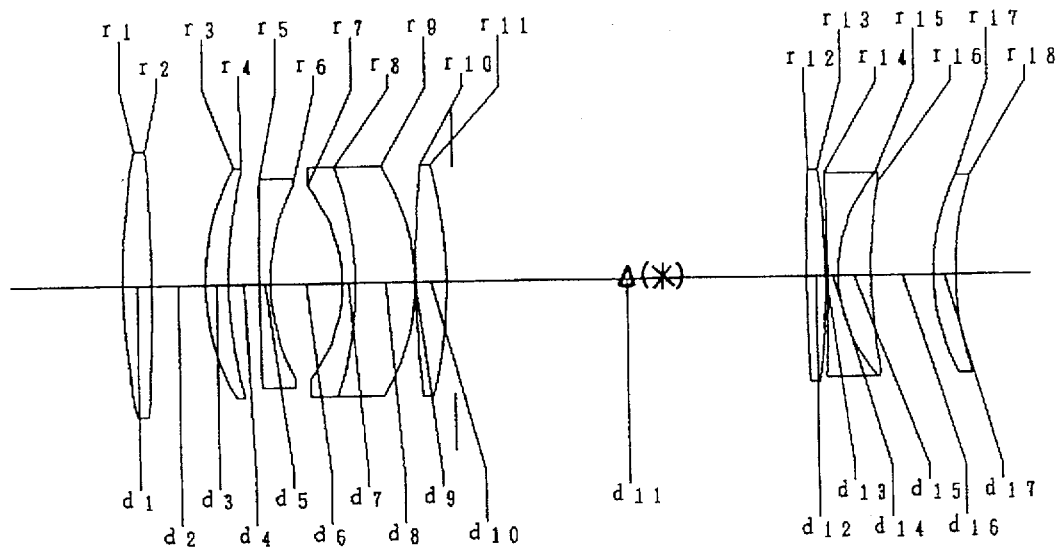
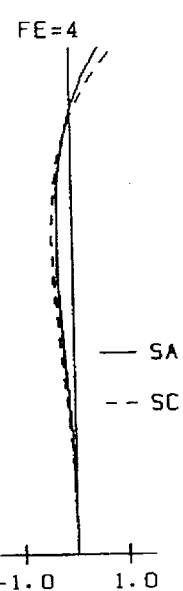
Fig.9A
Spherical Aberration
Sine Condition
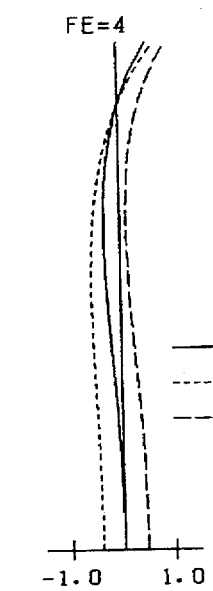
Fig.9B
Spherical Aberration
Chromatic Aberration
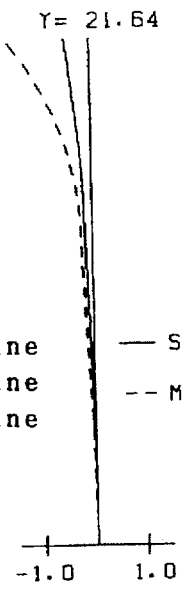
Fig.9C
Astigmatism
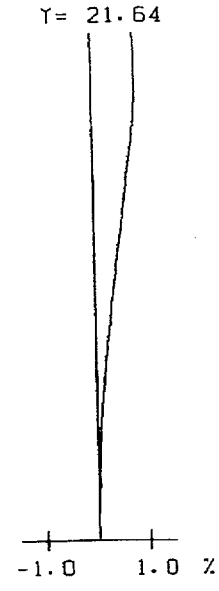
Fig.9D
Distortion Fig. 10
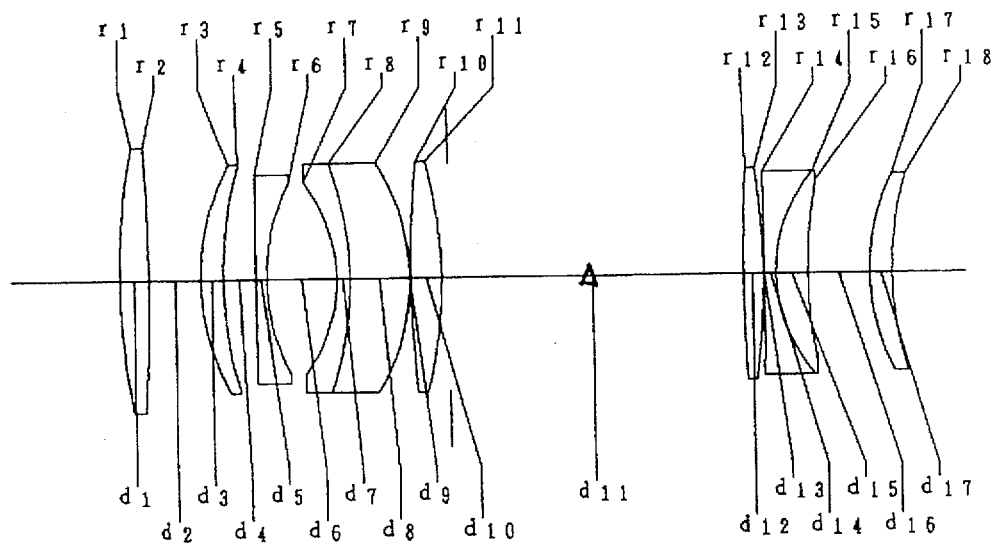
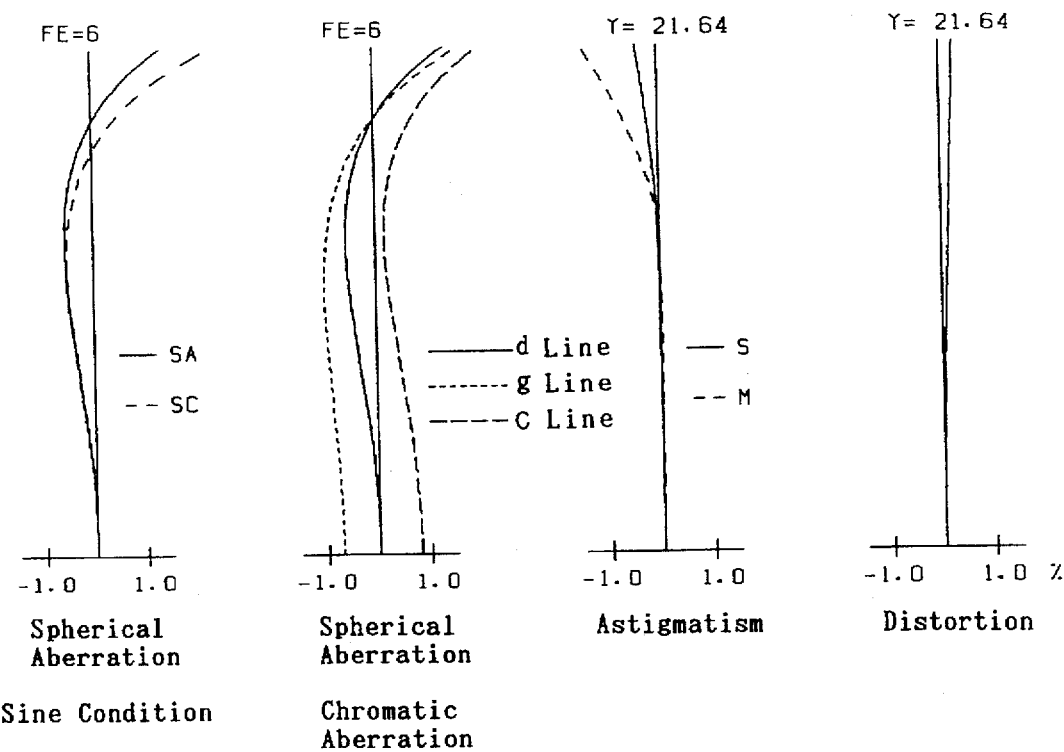
Fig. 11A — Spherical Aberration Sine Condition
Fig. 11B — Spherical Aberration Chromatic Aberration
Fig. 11C — Astigmatism
Fig. 11D — Distortion Fig. 12
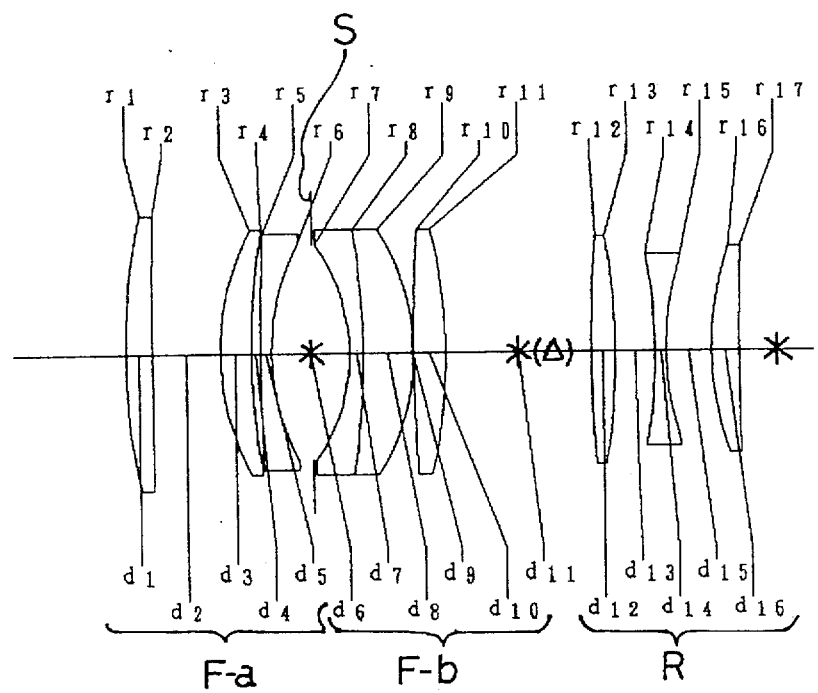
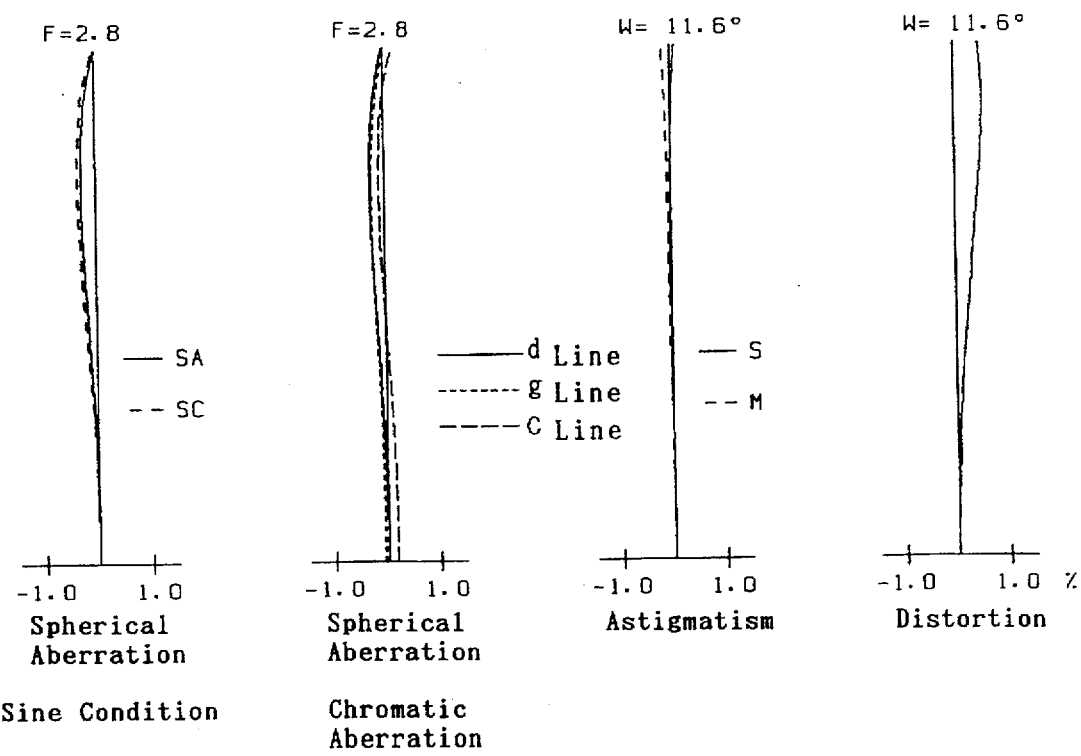
Fig. 13A   Fig. 13B   Fig. 13C   Fig. 13D Spherical Aberration
Sine Condition Spherical Aberration
Chromatic Aberration Astigmatism Distortion Spherical Aberration
Sine Condition Spherical Aberration
Chromatic Aberration Astigmatism Distortion

ZOOM LENS

BACKGROUND OF THE INVENTION

1. Field of the Invention

The present invention relates to a zoom lens which can be used to focus on an object from a distance (normally infinite) to a close distance. More particularly, the present invention relates to a zoom lens in which the zooming operation can be carried out in a close distance range (macro range).

2. Description of the Related Art

Generally speaking, a lateral magnification of a zoom lens for a still camera at the closest object distance (the shortest object distance at which the focusing can be effected) is approximately −1/10 at the short focal length extremity or −1/4 at the long focal length extremity.

In a single (fixed) focal length macro lens, an object from a distance to a life-size shot distance (approximately −1.0) can be photographed. However, only one magnification can be obtained at a specific object distance (i.e., distance between the object to be photographed and an image surface). Namely, it is impossible to vary the magnification at the same object distance. Consequently, in a conventional single focal length macro lens, it is necessary for a photographer to inconveniently move the camera body in order to vary the object size (composition). In particular, the movement of the camera body is more inconvenient for a macro shot, since the camera body is usually secured to a tripod to prevent camera-shake.

A zoom lens for a copier has a great lateral magnification ($m \approx 0.7$–$1.4$), but the object distance thereof is fixed.

SUMMARY OF THE INVENTION

It is an object of the present invention to provide a zoom lens in which the zooming can be effected not only for a most distant object (object at a longest distance but also a close object (object at a shortest distance), wherein the lateral magnification particularly at the shortest object distance and at the long focal length extremity is considerably increased in comparison with conventional zoom lenses, and wherein the zooming operation can be carried out in a macro range.

Namely, the object of the present invention is to increase the lateral magnification of a zoom lens at the macro range.

According to the present invention, there is provided a zoom lens comprising at least two lens groups of a front lens group and a rear lens group, in this order from the object side, wherein the zooming operation in which the front lens group and the rear lens group are relatively moved and the focusing operation in which at least one of the front and rear lens groups is moved can be carried out, and wherein if the zoom ratio when the zooming from the short focal length extremity to the long focal length extremity is effected while keeping an in-focus condition for an object at a longest distance is $Z_o$, and the zoom ratio when the zooming from the short focal length extremity to the long focal length extremity is effected while keeping an in-focus condition for an object at a closest disrace is $Z_x$, respectively, the zoom lens satisfies the relationship defined by the following formula (1);

$$1.07 < Z_x / Z_o \tag{1}$$

wherein:
$Z_x = m_L / m_S$, and
$Z_o = f_L / f_S$, wherein $m_L$ equals a lateral magnification of the whole lens system at the long focal length extremity and at the shortest object distance, $m_S$ equals a lateral magnification of the whole lens system at the short focal length extremity and at the shortest object distance, $f_L$ equals a focal length of the whole lens system at the long focal length extremity and at the longest object distance, and $f_S$ equals a focal length of the whole lens system at the short focal length extremity and at the longest object distance.

Note that the shortest object distance refers to a shortest distance (at which the focusing can be executed) at the long focal length extremity.

Preferably, the front lens group is moved toward the object side when the zooming from the long focal length extremity to the short focal length extremity is effected and satisfies the following formulae (2) and (3);

$$1.0 < |m_{R-S}|, \text{ and} \tag{2}$$

$$0.05 < X_F / f_S, \tag{3}$$

wherein $m_{R-S}$ equals a lateral magnification of the rear lens group at the longest object distance and at the short focal length extremity, and $X_F$: total displacement of the front lens group upon zooming.

The front lens group preferably forms a focusing lens which is moved toward the object side as the object distance reduces from the long distance to a short distance during the focusing, and satisfies the following formula (4);

$$0.25 < \Delta X_{max} / |f_{F-L}| < 1.0, \tag{4}$$

wherein $\Delta X_{max}$ equals a maximum displacement of the front lens group during the focusing operation, and $f_{F-L}$ equals a focal length of the front lens group at the long focal length extremity.

A zoom lens according to the present invention can be either of a telephoto type comprising a front lens group of a positive power and a rear lens group of a negative power, in this order from the object side, or an inverted telephoto type (retro-focus type) comprising a front lens group of a negative power and a rear lens group of a positive power, in this order from the object side. The telephoto type lens has advantages that the distance (working distance) between the object and the first lens surface can be increased in comparison with the inverted telephoto type lens and that macro-photographing an object, such as, for example, an insect, or macro-photographing under illumination light can be easily carried out. Accordingly, the telephoto type lens can be advantageously used as an interchangeable lens for a single lens reflex camera. On the other hand, the inverted telephoto type lens is disadvantageous from the viewpoint of the working distance, and is not suitable for an interchangeable lens for a single lens reflex camera, since the entire lens length becomes long relative to the focal length. However, the inverted type lens has an advantage that the angle of view can be easily increased. The selection of the telephoto type or inverted telephoto type is determined by taking into account the advantages and disadvantages mentioned above.

If the working distance is considered most important, a zoom lens comprises at least two lens groups, a front lens group of positive power and a rear lens group of negative power, in this order from the object side, wherein both the front lens group and the rear lens group are moved linearly toward the object side during the zooming operation from the long focal length extremity to the short focal length extremity, and the front lens group is moved toward the object side as the object distance is decreased from the long object distance to the short object distance during the focusing operation. The zoom lens satisfies the relationship defined by the following formulae (2'), (3') and (4);

$$1.1 < |m_{R-S}|, \quad (2')$$

$$0.1 < X_F/f_S, \text{ and} \quad (3')$$

$$0.25 < \Delta X_{max}/|f_{F-L}| < 1.0, \quad (4)$$

wherein $m_{R-S}$ equals a lateral magnification of the rear lens group at the longest object distance and at the short focal length extremity, $X_F$ equals a total displacement of the front lens group upon zooming, $f_S$ equals a focal length of the whole lens system at the short focal length extremity and at the longest object distance, $\Delta X_{max}$ equals a maximum displacement of the front lens group during the zooming operation, and $f_{F-L}$ equals a focal length of the front lens group at the long focal length extremity.

In this zoom lens, the front lens group can be split into two sub lens groups of an F-a-th lens group and an F-b-th lens group and satisfies the following formula (5);

$$1.1 < \Delta X_{F-a}/\Delta X_{F-b}, \quad (5)$$

wherein $\Delta X_{F-a}$ equals a total displacement of the F-a-th lens group during the zooming, and $\Delta X_{F-b}$ equals a total displacement of the F-b-th lens group during the zooming.

If it is not necessary to take the working distance into account, a zoom lens comprises at least two lens groups of a front lens group of negative power and a rear lens group of positive power, in this order from the object side, wherein both the front lens group and the rear lens group are moved lineary toward the object side during the zooming operation from the long focal length extremity to the short focal length extremity, and the front lens group is moved toward the object side as the object distance is decreased from the long object distance to the short object distance during the focusing operation. The zoom lens satisfies the relationship defined by the following formulae (2), (3) and (4);

$$1.0 < |m_{R-S}|, \quad (2)$$

$$0.05 < X_F/f_S, \text{ and} \quad (3)$$

$$0.25 < \Delta X_{max}/|f_{F-L}| < 1.0, \quad (4)$$

wherein $m_{R-S}$ equals a lateral magnification of the rear lens group at the longest object distance and at the short focal length extremity, $X_F$ equals a total displacement of the front lens group upon zooming, $f_S$ equals a focal length of the whole lens system at the short focal length extremity and at the longest object distance, $\Delta X_{max}$ equals a maximum displacement of the front lens group during the focusing operation, and $f_{F-L}$ equals a focal length of the front lens group at the long focal length extremity.

The present disclosure relates to subject matter contained in Japanese Patent Application No. 7-311206 (filed on Nov. 29, 1995) which is expressly incorporated herein by reference in its entirety.

BRIEF DESCRIPTION OF THE DRAWINGS

The invention will be described below in detail with reference to the attached drawings, in which:

FIG. 4 is a schematic view of a first embodiment of a lens arrangement of a zoom lens shown in FIG. 1, at a wide angle extremity when the lens is focused on an object at the longest distance;

FIGS. 5A, 5B, 5C and 5D are aberration diagrams of a lens system shown in FIG. 4;

FIG. 6 is a schematic view of a lens arrangement of a zoom lens shown in FIG. 4, at a telephoto extremity, when the lens is focused on an object at the longest distance;

FIGS. 7A, 7B, 7C and 7D are aberration diagrams of a lens system shown in FIG. 6;

FIG. 8 is a schematic view of a lens arrangement of a zoom lens shown in FIG. 4 at a wide-angle extremity when the lens is focused on an object at the shortest distance;

FIGS. 9A, 9B, 9C and 9D are aberration diagrams of a lens system shown in FIG. 8;

FIG. 10 is a schematic view of a lens arrangement of a zoom lens shown in FIG. 4 at a telephoto extremity when the lens is focused on an object at the shortest distance;

FIGS. 11A, 11B, 11C and 11D are aberration diagrams of a lens system shown in FIG. 10;

FIG. 12 is a schematic view of a second embodiment of a lens arrangement of a zoom lens shown in FIG. 2, at a wide angle extremity when the lens is focused on an object at the longest distance;

FIGS. 13A, 13B, 13C and 13D are aberration diagrams of a lens system shown in FIG. 12;

DESCRIPTION OF THE PREFERRED EMBODIMENTS

Figure 1:
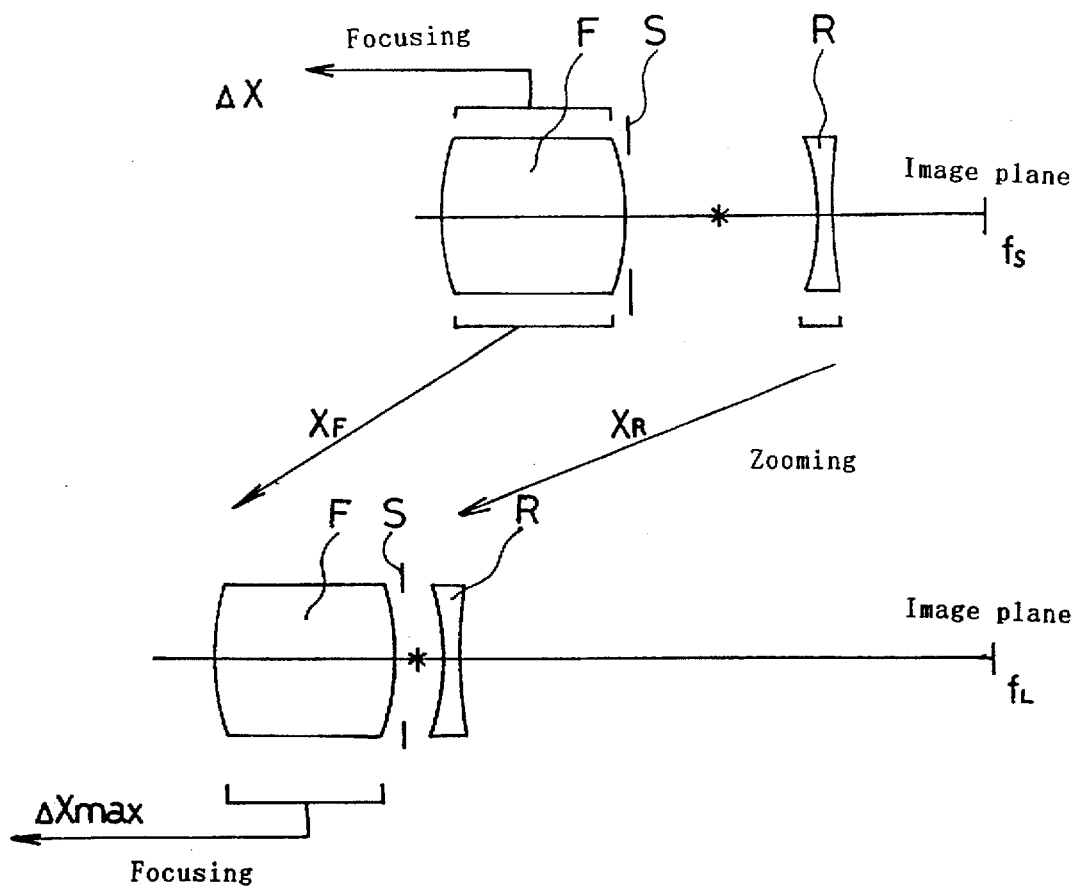
FIG. 1 is a conceptual view of a lens arrangement of a first type zoom lens and the loci of the movement of the lens groups during the zooming operation and the focusing operation, according to the present invention (corresponding to a first embodiment)

In a zoom lens for a conventional still camera, the zoom ratio for the most distant object (object at the longest distance) or the closest object (object at the shortest distance) is substantially constant. It can be considered that this is one of the reasons that the lateral magnification at the shortest object distance cannot be increased in the prior art.

Unlike the conventional zoom lens, according to the basic concept of the present invention, the zoom ratio is set to be small for a most distant object and is gradually increased as the object distance is reduced, so that the lateral magnification at the shortest object distance can be increased by a simple and small structure.

Expression (1) specifies the zoom ratio for a most distant object and the zoom ratio for a closest object. If the ratio defined in expression (1) is below the lower limit, the zoom ratio is substantially constant as in the conventional zoom lens, and hence, it is difficult to increase the lateral magnification at the shortest object distance, or the zoom lens system becomes considerably large, contrary to the primary object of the present invention.

In the present invention, the zoom ratio Zo for a most distant object is relatively small and the zoom ratio Zx for a closest object is relatively large. To make the zoom lens small, it is preferable that the range of the zoom ratio Zo for the most distant object satisfy the following expression (6);

$$1.1 < Zo$$

If the zoom ratio Zo is smaller than the lower limit in expression (6), the zoom ratio is too small to obtain a sufficient zoom range.

Expression (2) or (2') specifies the lateral magnification of the rear lens group. If the lateral magnification of the rear lens group is below the lower limit in expression (2), the change in the focal length relative to the relative movement of the front and rear lens groups is so small that the lens system must be made large in order to obtain a predetermined zoom ratio. The zoom lens according to the present invention can be made of either a telephoto type lens in which the front lens group is positive and the rear lens group is negative, or an inverted telephoto type lens in which the front lens group is negative and the rear lens group is positive. In case of the telephoto type, the value of mR–s is positive. If $|mR-s|=1$, the power of the rear lens group is substantially equal to zero, and hence no zooming function can be achieved. In the case of the inverted telephoto type, the value of mR–s is negative. Consequently, even if $|mR-s|=1$, the rear lens group has a positive power, and hence the zooming function can be achieved. Namely, the lower limit of the value of $|mR-s|$ in the telephoto type must be slightly larger than that in the inverted telephoto type.

Expression (3) or (3') specifies the total displacement of the front lens group upon zooming. If the total displacement is smaller than the lower limit in expression (3) or (3'), it is difficult to increase the zoom ratio Zx for the closest object relative to the zoom ratio Zo for the most distant object. The requirements defined by expression (3) and (3') are different from one another, corresponding to expressions (2) and (2'), i.e., the telephoto type and inverted telephoto type.

Expression (4) specifies the maximum displacement of the front lens group upon focusing. If the ratio defined in expression (4) is smaller than the lower limit, it is impossible to increase the lateral magnification at the shortest object distance. Conversely, if the ratio defined in expression (4) is larger than the upper limit, the displacement of the front lens group upon focusing is so large that the lens system becomes large.

The zoom lens according to the present invention is comprised of at least two lens groups including the front lens group and the rear lens group. It is possible to split the front lens group into two sub-lens groups whose movements during the zooming operation are different from one another. Consequently, the aberrations produced during the zooming operation can be more effectively compensated for.

Expression (5) specifies the displacement ratio between the sub-lens groups of the front lens group. If the ratio is below the lower limit in expression (5), there is a large variation in spherical aberration, comatic aberration or astigmatism, produced during the zooming operation.

Note that if the front lens group (or the rear lens group) is split into at least two sub-lens groups which are moved along different loci upon focusing, the variation of the aberrations by the focusing can be restricted.

In the zoom lens according to the present invention, the displacement of the lenses during the focusing for a close object varies slightly depending on the focal length. Namely, if the zooming is effected in the macro range, the focus movement (out-of-focus) occurs. However, in a single lens reflex camera in which the focus state can be viewed, the focus state particularly upon a macro shot is usually strictly observed by a photographer and hence there is no problem. Furthermore, it is preferable that an automatic focusing (AF) mechanism be employed, since the focus can be automatically controlled.

Note that the arrangement in which the front lens group is moved during the focusing operation is more preferable than the arrangement in which the lens groups are entirely moved, since the focus movement in the macro range during the zooming operation is small.

Figure 2:
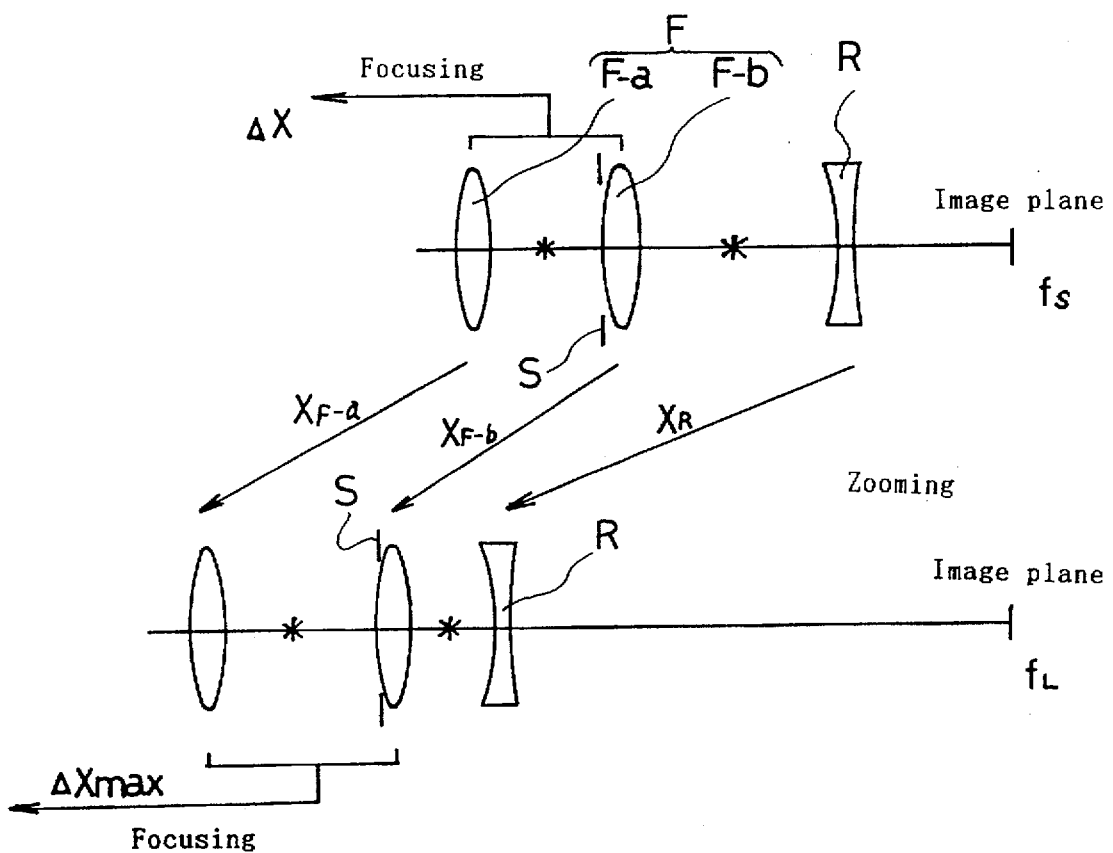
FIG. 2 is a conceptual view of a lens arrangement of a second type zoom lens and the loci of the movement of the lens groups during the zooming operation and the focusing operation, according to the present invention (corresponding to second and third embodiments)
Figure 3:
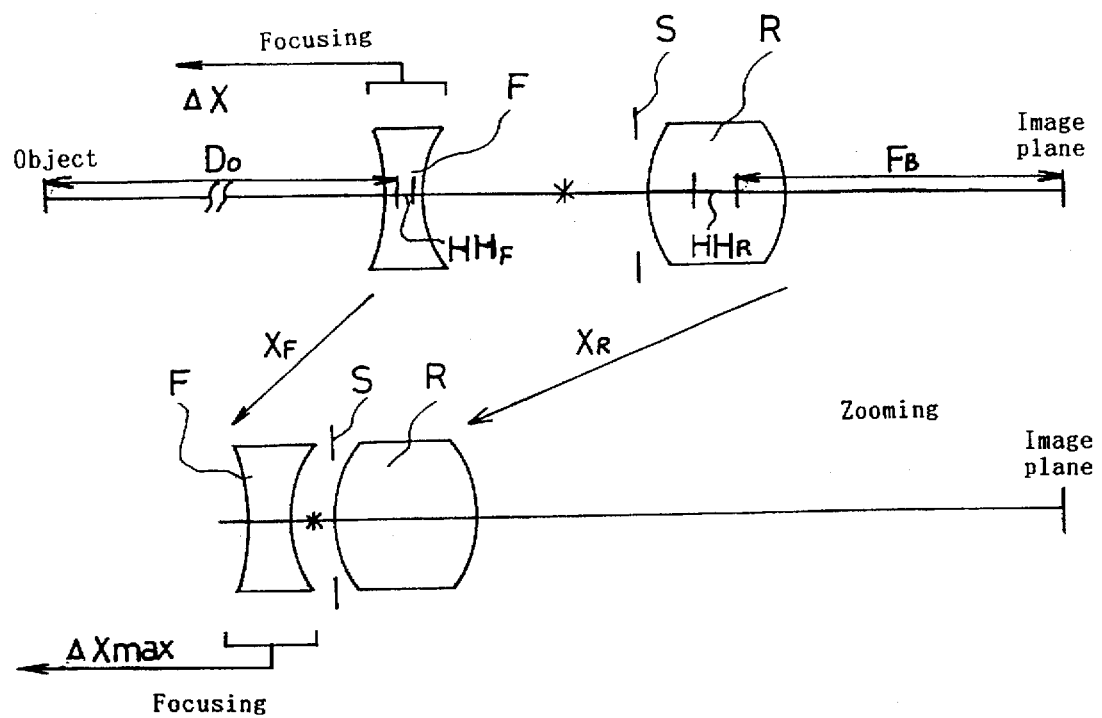
FIG. 3 is a conceptual view of a lens arrangement of a third type zoom lens and the loci of the movement of the lens groups during the zooming operation and the focusing operation, according to the present invention (corresponding to a fourth embodiment)
Figure 14:
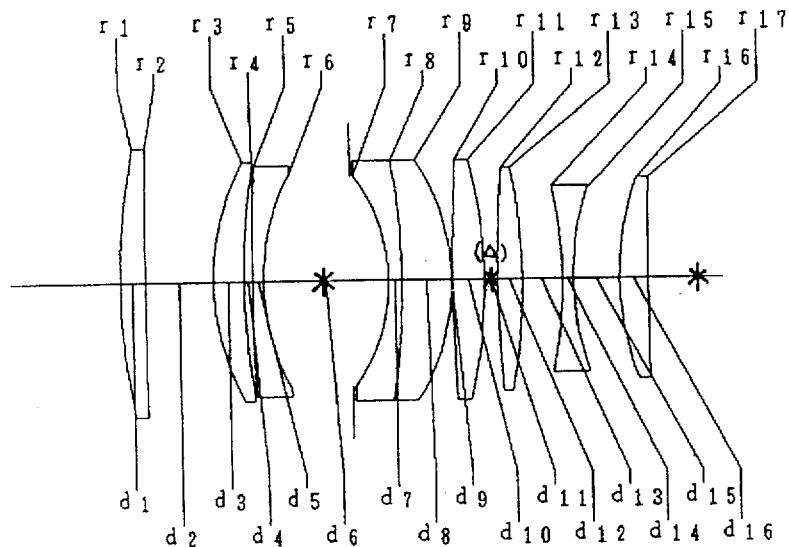
FIG. 14 is a schematic view of a lens arrangement of a zoom lens shown in FIG. 12, at a telephoto extremity, when the lens is focused on an object at the longest distance.
Figures 15A, 15B, 15C, 15D:
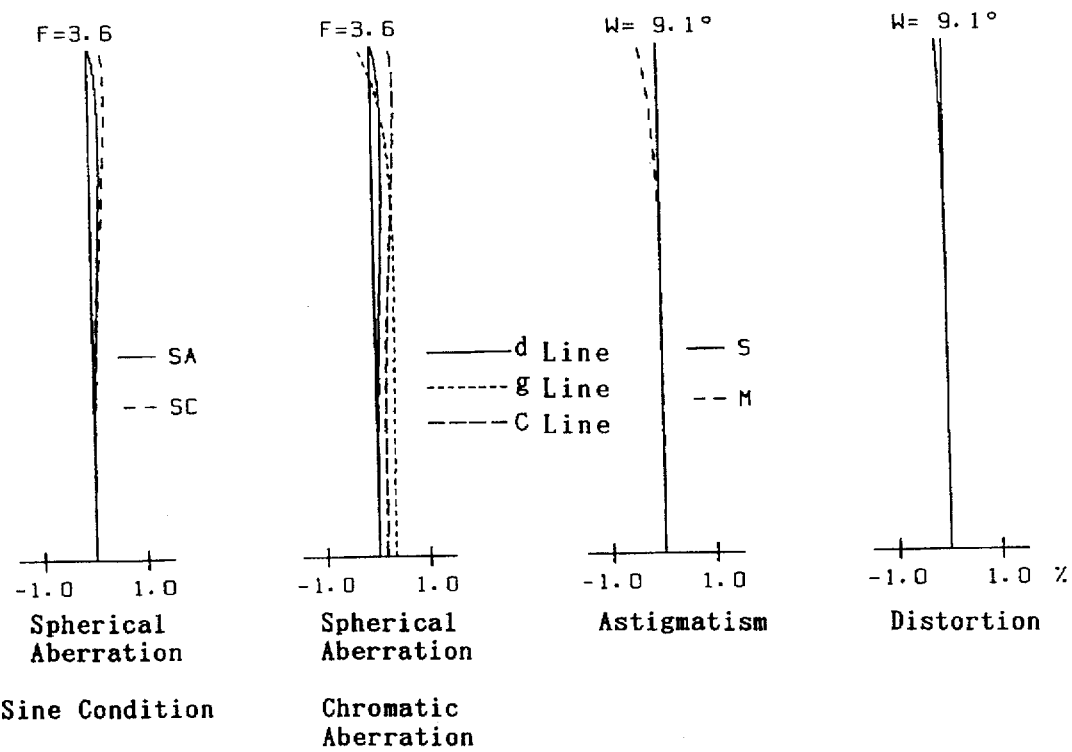
FIGS. 15A, 15B, 15C and 15D are aberration diagrams of a lens system shown in FIG. 14.
Figure 16:
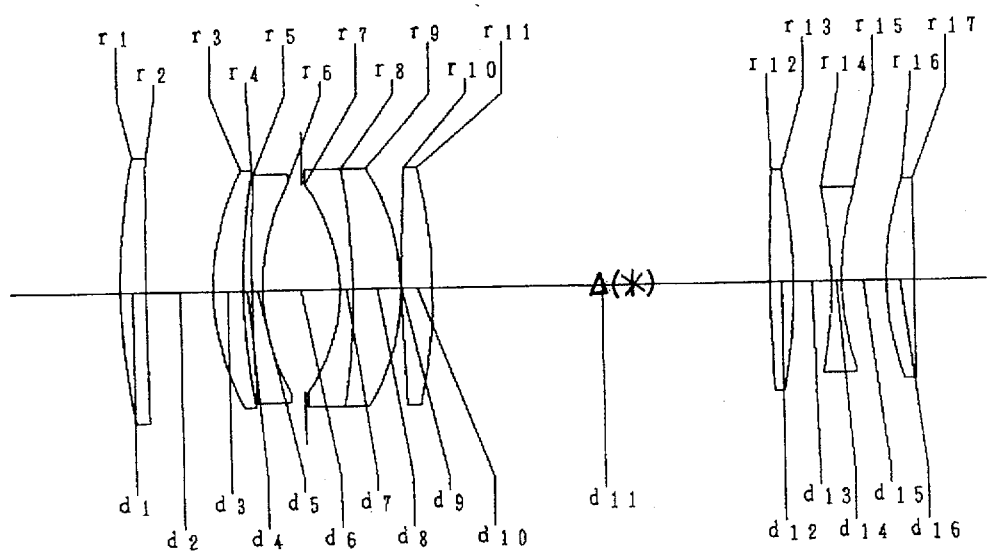
FIG. 16 is a schematic view of a lens arrangement of a zoom lens shown in FIG. 12 at a wide-angle extremity when the lens is focused on an object at the shortest distance.
Figure 17A:
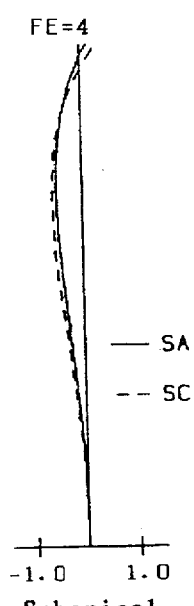
FIGS. 17A, 17B, 17C and 17D are aberration diagrams of a lens system shown in FIG. 16.
Figure 17B:
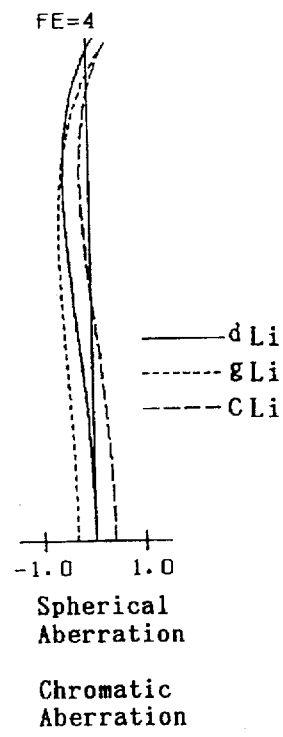
Figure 17C:
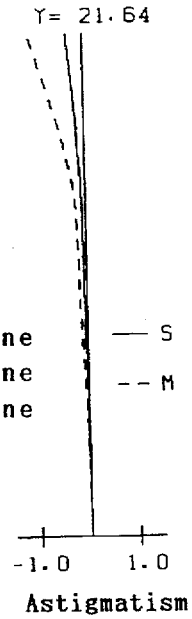
Figure 17D:
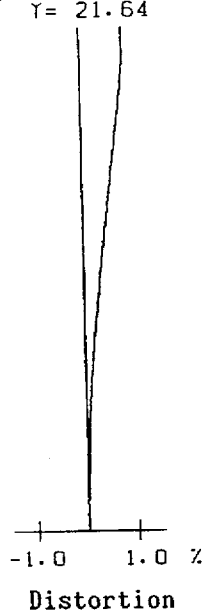
Figure 18:
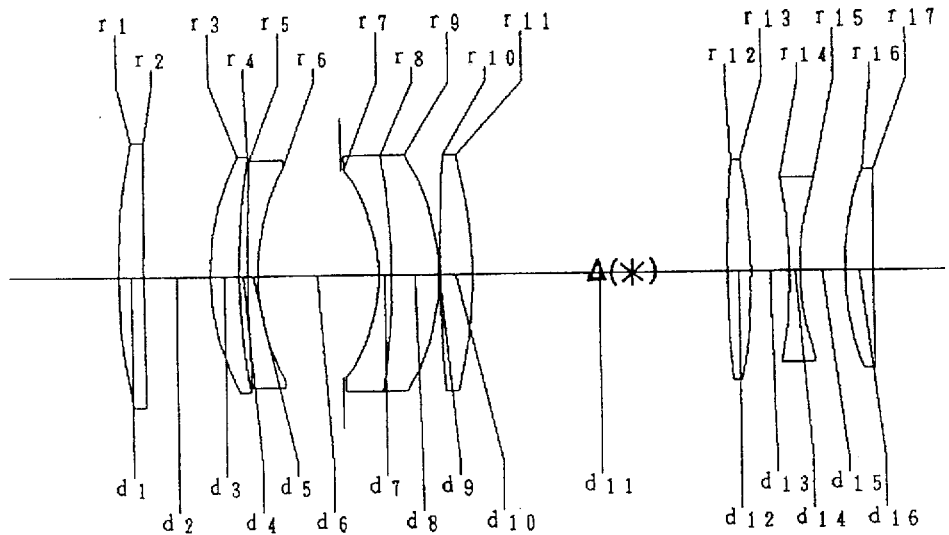
FIG. 18 is a schematic view of a lens arrangement of a zoom lens shown in FIG. 12 at a telephoto extremity when the lens is focused on an object at the shortest distance.
Figures 19A, 19B, 19C, 19D:
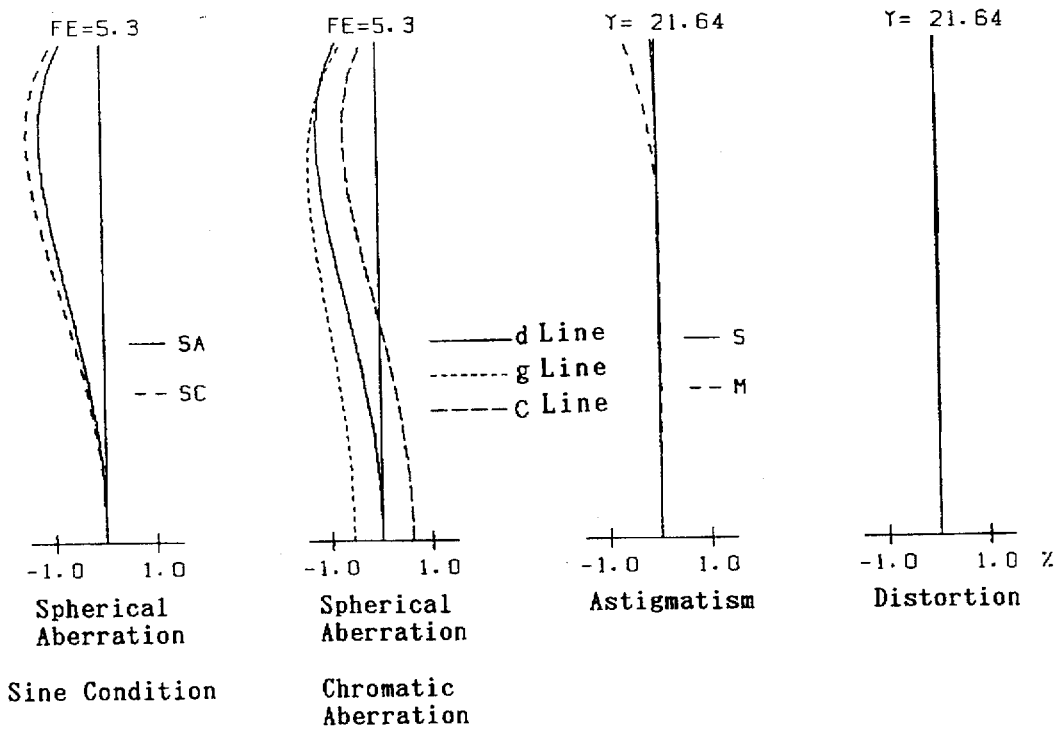
FIGS. 19A, 19B, 19C and 19D are aberration diagrams of a lens system shown in FIG. 18.
Figure 20:
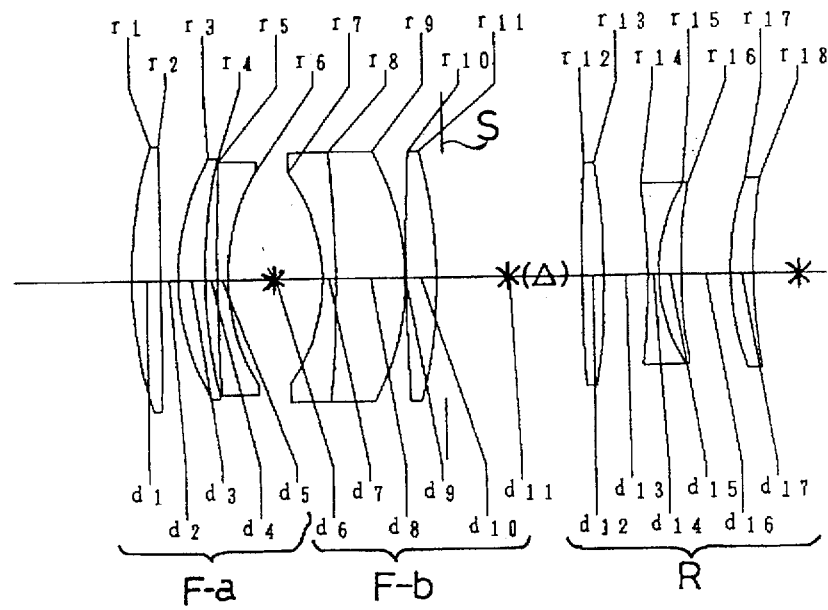
FIG. 20 is a schematic view of a third embodiment of a lens arrangement of a zoom lens shown in FIG. 2, at a wide angle extremity when the lens is focused on an object at the longest distance.
Figures 21A, 21B, 21C, 21D:
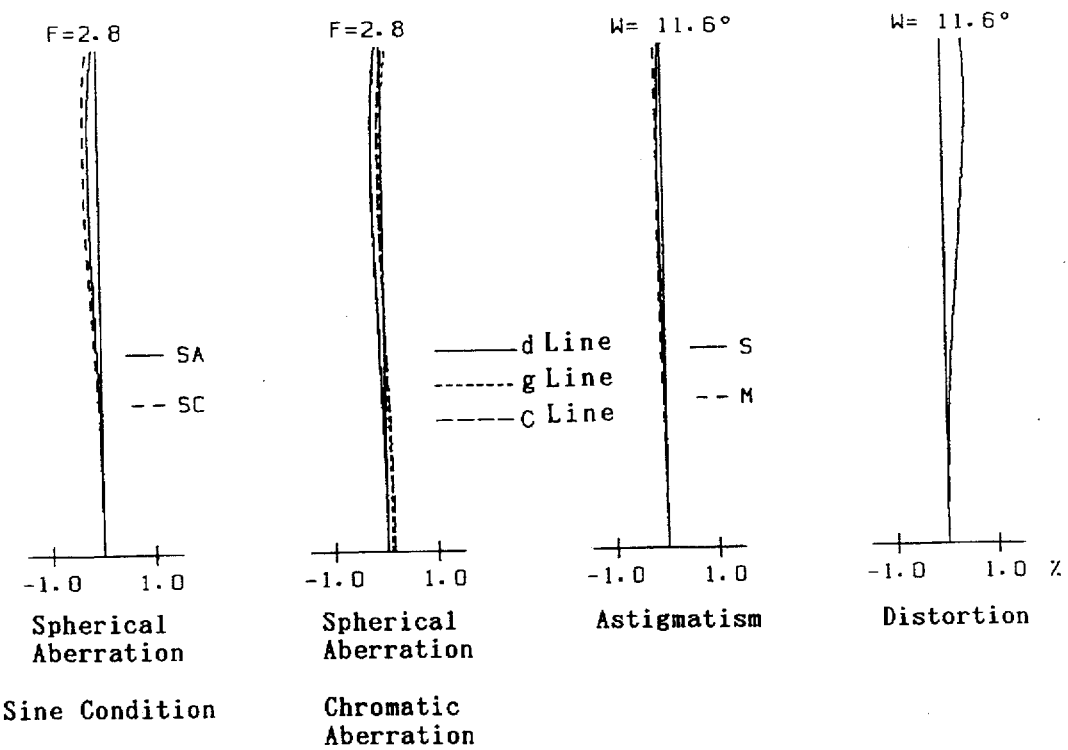
FIGS. 21A, 21B, 21C and 21D are aberration diagrams of a lens system shown in FIG. 20.
Figure 22:
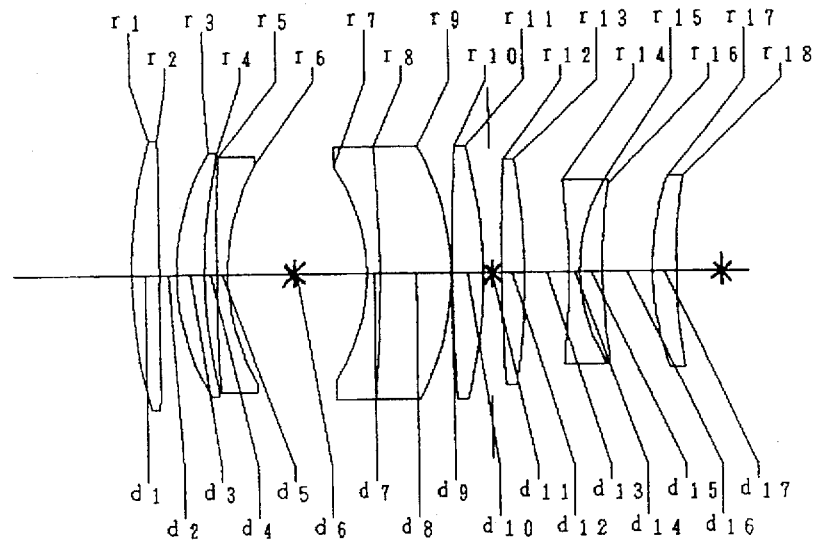
FIG. 22 is a schematic view of a lens arrangement of a zoom lens shown in FIG. 20, at a telephoto extremity, when the lens is focused on an object at the longest distance.
Figures 23A, 23B, 23C, 23D:
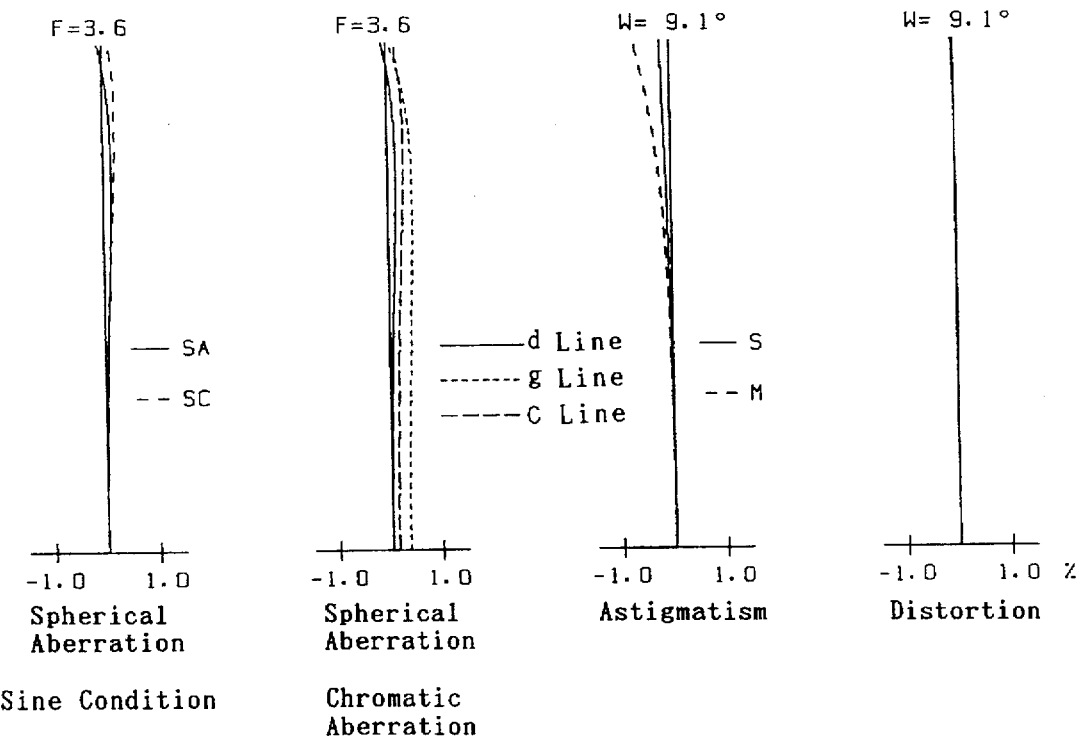
FIGS. 23A, 23B, 23C and 23D are aberration diagrams of a lens system shown in FIG. 22.
Figure 24:
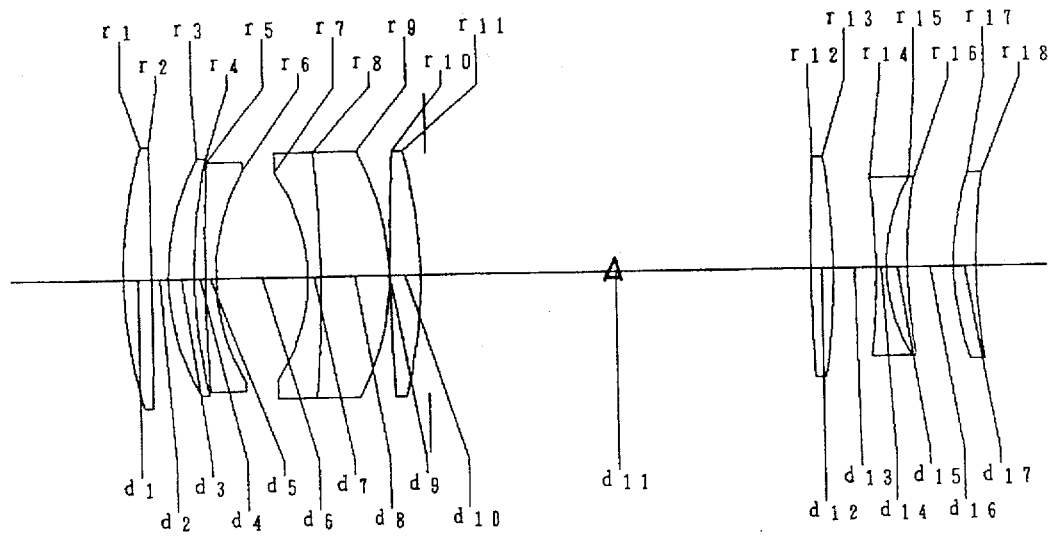
FIG. 24 is a schematic view of a lens arrangement of a zoom lens shown in FIG. 20 at a wide-angle extremity when the lens is focused on an object at the shortest distance.
Figures 25A, 25B, 25C, 25D:
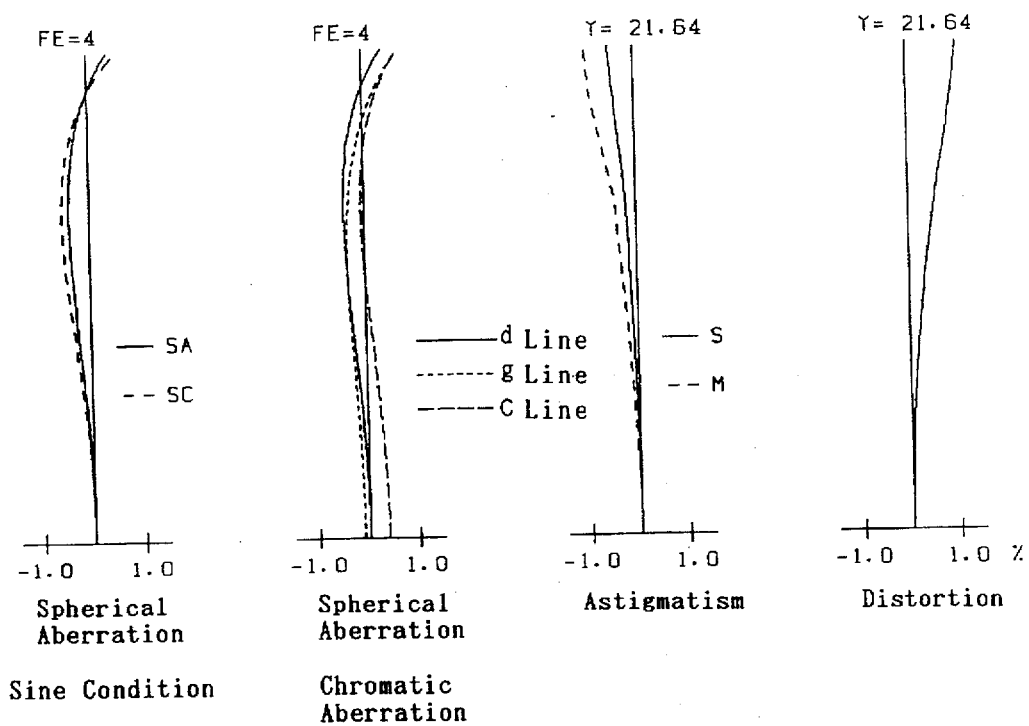
FIGS. 25A, 25B, 25C and 25D are aberration diagrams of a lens system shown in FIG. 24.
Figure 26:
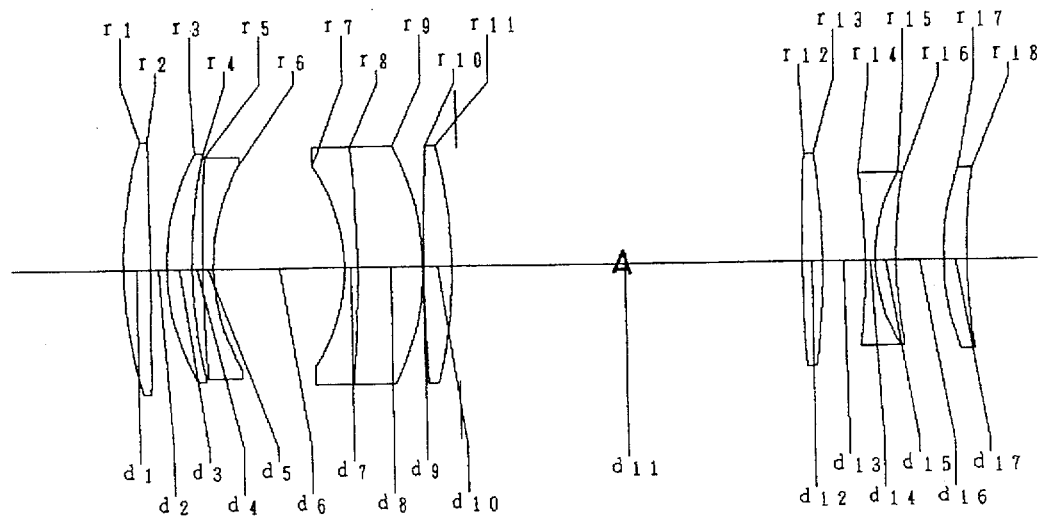
FIG. 26 is a schematic view of a lens arrangement of a zoom lens shown in FIG. 20 at a telephoto extremity when the lens is focused on an object at the shortest distance; and, FIGS. 27A, 27B, 27C and 27D are aberration diagrams of a lens system shown in FIG. 26.
Figures 27A, 27B, 27C, 27D:
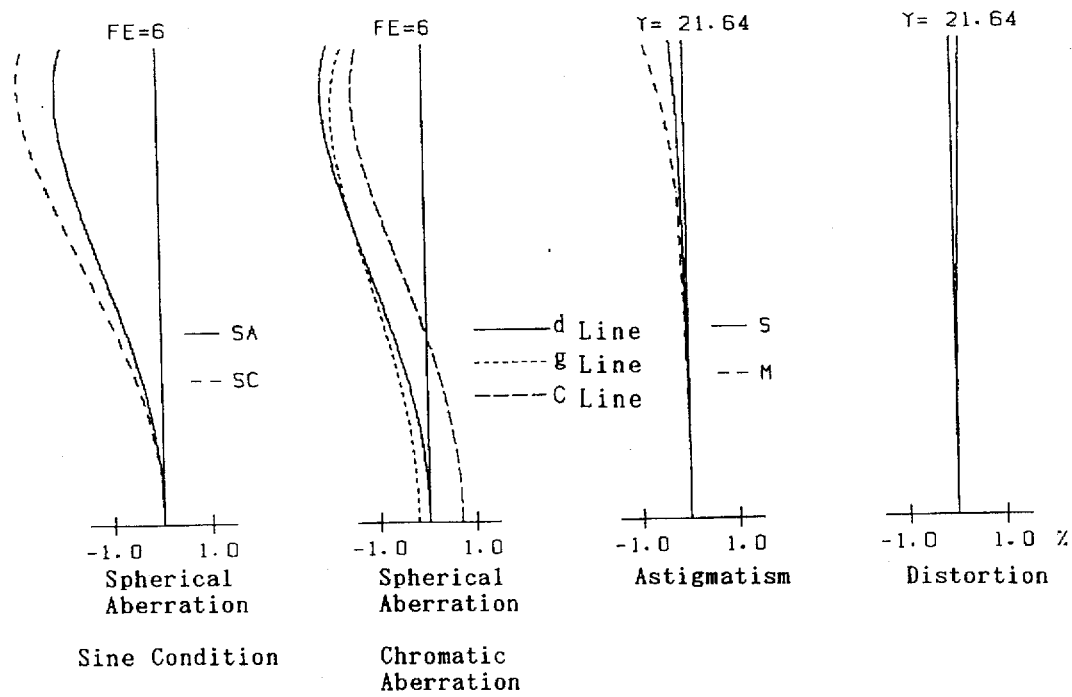

FIGS. 1, 2 and 3 show three examples of movement loci of the zoom lens during the zooming operation and the focusing operation. In FIG. 1, the zoom lens comprises two lens groups of a positive front lens group F and a negative rear lens group R, in this order from the object side. There is a diaphragm S behind and integral with the front lens group F. The zooming operation from the long focal length extremity to the short focal length extremity is carried out by moving the front lens group F and the rear lens group R linearly toward the object side while reducing the distance therebetween. The focusing operation is effected by moving the front lens group F toward the object side as the object distance is decreased. The asterisk (*) in the drawings represents the distance between the front and rear lens groups during the zooming operation, which varies upon the zooming operation.

In a zoom lens shown in FIG. 2, the front lens group F shown in FIG. 1 comprises a positive F-a-th lens group and a negative F-b-th lens group. The diaphragm S is formed integral with the F-b-th lens group. In the zooming operation from the long focal length extremity to the short focal length extremity, the front lens group F and the rear lens group R are moved linearly toward the object side while reducing the distance therebetween, and the F-a-th lens group and the F-b-th lens group are moved to increase the distance therebetween. The focusing operation is effected by moving the front lens group F toward the object side as the object distance is decreased. It is possible to split the rear lens group F into at least two sub-lens groups which are moved in accordance with different loci, upon zooming or focusing, instead of splitting the front lens group. It is possible to dispose the diaphragm S within the front lens group F.

The zoom lens shown in FIG. 3 comprises two lens groups of a negative front lens group F and a positive rear lens group R in this order from the object side. There is a diaphragm S behind and integral with the front lens group F. The diaphragm S is integrally provided in front of or within the rear lens group R. The zooming operation from the long focal length extremity to the short focal length extremity is carried out by moving the front lens group F and the rear lens group R linearly toward the object side while reducing the distance therebetween. The focusing operation is effected by moving the front lens group F toward the object side as the object distance is decreased. In the embodiment shown in FIG. 3, it is also possible to split the front lens group F or the rear lens group R into at least two sub-lens groups which are moved in accordance with different loci, upon zooming or focusing.

The zoom lens of the present invention can also be used as or applied to a projection lens in which a screen is provided on the object side and a light transmission type member to be projected, such as a sliding film is provided on the image surface to project the image of the light transmission member onto the screen.

Four embodiments (numerical examples) of the present invention will be discussed below.

<Embodiment 1>

The first embodiment corresponds to the first type zoom lens shown in FIG. 1. FIGS. 4, 6, 8 and 10 show lens arrangements at the long focal length extremity in which the lens is focused on an infinite object (infinite object/long focal length extremity); the long focal length extremity in which the lens is focused on a closest object (closest object/long focal length extremity); the short focal length extremity in which the lens is focused on an infinite object (infinite oject/short focal length extremity); and the short focal length extremity in which the lens is focused on a closest object (closest object/short focal length extremity), respectively.

$\Delta$ represents the distance of the adjacent lens groups which varies during the focusing operation. FIGS. 5A–5D, 7A7D, 9A–9D and 11A–11D show aberration diagrams corresponding to FIGS. 4, 6, 8 and 10, respectively.

In the aberration diagrams, "SA" represents the spherical aberration, "SC" the sine condition, "d-line", "g-line", and "C-line" the chromatic aberrations represented by the spherical aberrations, at the respective wavelengths, "S" the Sagittal rays, and "M" the Meridional rays, respectively.

Numerical data of the lens system of the first embodiment is shown in Table 1 below. In the following tables and drawings, "$F_{NO}$" designates the F-number, "f" the focal length, "FE" the effective F-number at the shortest object distance, "W" the half angle of view, "Y" the image height, "m" the lateral magnification at the shortest object distance, "$f_B$" the back focal distance, "R" the radius of curvature, "D" the thickness of a lens or the distance between lenses, "Nd" the refractive index of the d-line, and "vd" the Abbe number, respectively.

TABLE 1

$F_{NO} = 1:2.8–3.6$
$f = 105–135$
$W = 9.1°–11.6°$
$Y = 21.64$
$f_B = 39.60–87.64$

| Surface No. | R | D | $N_d$ | $v_d$ |
|---|---|---|---|---|
| 1 | 96.994 | 3.90 | 1.77250 | 49.6 |
| 2 | −281.792 | 7.18 | — | — |
| 3 | 32.782 | 3.17 | 1.83400 | 37.2 |
| 4 | 58.958 | 4.24 | — | — |
| 5 | 754.691 | 1.50 | 1.80518 | 25.4 |
| 6 | 29.873 | 9.49 | — | — |
| 7 | −22.532 | 1.80 | 1.64769 | 33.8 |
| 8 | −49.210 | 8.11 | 1.77250 | 49.6 |
| 9 | −30.769 | 0.15 | — | — |
| 10 | 163.697 | 4.15 | 1.73400 | 51.5 |
| 11 | −63.530 | 1.00 | — | — |
| diaphragm | ∞ | 18.50–1.20 | — | — |
| 12 | 297.899 | 2.66 | 1.74077 | 27.8 |
| 13 | −109.670 | 0.28 | — | — |
| 14 | −389.226 | 1.50 | 1.88300 | 40.8 |
| 15 | 21.123 | 4.50 | 1.59270 | 35.3 |
| 16 | 72.214 | 8.38 | — | — |
| 17 | 30.786 | 3.00 | 1.51633 | 64.1 |
| 18 | 45.179 | — | — | — |

The numerical values of the expressions and intermediate values which are used to obtain the numerical values in the first embodiment are shown in Table 2 below.

TABLE 2

| | f | 105 | 135 |
|---|---|---|---|
| object at infinite | $d_{F–R}$ | 19.50 | 2.20 |
| | $f_B$ | 39.60 | 87.64 |
| object distance | m | | |
| | $d_O$ | −0.614 | −1.028 |
| U = 0.36 m | | 207.07 | 167.31 ** |
| | $d_{F–R}$ | | *** |
| | | 49.32 | 41.05 |
| | $f_B$ | 39.60 | 87.64 |
| | Δ X | 29.80 | 38.80 |

**designates figures which vary upon focusing.
*** designates figures which are constant upon focusing.

$Z_O = 1.286$
$X_F = 30.7$
$X_R = 48.0$
$Z_X = 1.674$
$\Delta X_{max} = 38.8$
$f_{F–S} = f_{F–L} = 71.4$ (constant)
$f_R = −114.4$
$Z_X/Z_O = 1.302$
$m_{R–S} = 1.467$
$\Delta X_{max}/f_{F–L} = 0.54$
$X_{F–a}/X_{F–b} = 1.0$ (does not satisfy formula (5) since the front lens group is not split into sub-lens groups.)
$X_F/f_S = 0.29$ wherein
$X_R$ equals a total displacement of the rear lens group upon zooming,
$d_O$ equals a distance between an object and 1st surface from the object side,
$d_{F–R}$ equals a distance between the front and rear lens groups, and
$f_{F–L}$ equals a focal length of the front lens group at the shortest focal length extremity.

<Embodiment 2>

The second embodiment corresponds to the lens type shown in FIG. 2. FIGS. 12, 14, 16 and 18 show lens arrangements at the infinite object/long focal length extremity; the closest object/long focal length extremity; the infinite object/short focal length extremity; and the closest object/short focal length extremity, respectively. FIGS. 13A–13D, 15A–15D, 17A–17D and 19A–19D are diagrams of various aberrations in the optical system shown in FIGS. 12, 14, 16 and 18, respectively. Numerical data in the lens system is shown in Table 3 below.

TABLE 3

$F_{NO} = 1:2.8–3.6$
$f = 105–135$
$W = 9.1°–11.6°$
$Y = 21.64$
$f_B = 38.42–80.82$

| Surface No. | R | D | $N_d$ | $v_d$ |
|---|---|---|---|---|
| 1 | 89.316 | 3.50 | 1.78590 | 44.2 |
| 2 | 891.631 | 9.20 | — | — |
| 3 | 34.846 | 4.10 | 1.83400 | 37.2 |
| 4 | 92.863 | 1.16 | — | — |
| 5 | 253.905 | 1.50 | 1.80518 | 25.4 |
| 6 | 30.768 | 5.50–11.81 | — | — |
| diaphragm | ∞ | 5.00 | — | — |
| 7 | −24.463 | 1.80 | 1.68893 | 31.1 |
| 8 | −100.263 | 6.62 | 1.74400 | 44.8 |
| 9 | −31.189 | 0.15 | — | — |
| 10 | 256.752 | 4.30 | 1.72000 | 42.0 |
| 11 | −68.812 | 19.71–1.82 | — | — |
| 12 | 203.490 | 3.24 | 1.75520 | 27.5 |
| 13 | −84.468 | 5.38 | — | — |
| 14 | −64.514 | 1.50 | 1.88300 | 40.8 |
| 15 | 38.903 | 6.22 | — | — |
| 16 | 40.236 | 3.80 | 1.51633 | 64.1 |
| 17 | 663.651 | — | — | — |

The numerical values of the expressions and intermediate values which are used to obtain the numerical values in the second embodiment are shown in Table 4 below.

TABLE 4

| | | f | 105 | 135 | |
|---|---|---|---|---|---|
| object at infinite | | $d_{a-b}$ | 10.50 | 16.81 | |
| | | $d_{F-R}$ | 19.71 | | |
| | | $f_B$ | 38.42 | 1.82 | |
| | | | | 80.82 | |
| object distance U = 0.40 m | | m | | | |
| | | $d_O$ | −0.504 | −0.759 | |
| | | | 251.78 | 204.67 | *** |
| | | $d_{a-b}$ | | | ** |
| | | $d_{F-R}$ | 10.50 | 16.81 | *** |
| | | | 46.84 | 35.24 | |
| | | $f_B$ | 38.42 | 80.82 | |
| | | ΔX | 27.10 | 33.40 | |

**designates figures which vary upon focusing
***designates figures which are constant upon focusing
$Z_O = 1.286$
$X_{F-a} = 30.8 = X_F$
$X_{F-b} = 24.5$
$X_R = 42.4$
$Z_X = 1.506$
$\Delta X_{max} = 33.4$
$f_{F-S} = 75.2$
$f_{F-L} = 77.1$
$f_R = −119.6$
$Z_X/Z_O = 1.171$
$\Delta X_{max}/f_{F-L} = 0.43$
$X_F/f_S = 0.29$
$X_{F-a}/X_{F-b} = 1.257$ <Embodiment 3>

The third embodiment corresponds to the lens type shown in FIG. 2. FIGS. 20, 22, 24 and 26 show lens arrangements at the infinite object/long focal length extremity; the closest object/long focal length extremity; the infinite object/short focal length extremity; and the closest object/short focal length extremity, respectively. FIGS. 21A–21D, 23A–23D, 25A–25D and 27A–27D are diagrams of various aberrations in the optical system shown in FIGS. 20, 22, 24 and 26, respectively. Numerical data in the lens system is shown in Table 5 below.

TABLE 5

$F_{NO} = 1:2.8–3.6$
$f = 105–135$
$W = 9.1°–11.6°$
$Y = 21.64$
$f_B = 39.00–80.68$

| Surface No. | R | D | $N_d$ | $v_d$ |
|---|---|---|---|---|
| 1 | 64.466 | 3.90 | 1.76200 | 40.1 |
| 2 | −1507.058 | 2.41 | — | — |
| 3 | 34.043 | 3.68 | 1.61800 | 63.4 |
| 4 | 74.998 | 1.57 | — | — |
| 5 | 276.982 | 1.50 | 1.74950 | 35.3 |
| 6 | 29.910 | 12.79–19.06 | — | — |
| 7 | −25.490 | 1.80 | 1.71736 | 29.5 |
| 8 | −189.152 | 9.64 | 1.80400 | 46.6 |
| 9 | −35.637 | 0.15 | — | — |
| 10 | 305.949 | 4.15 | 1.73400 | 51.5 |
| 11 | −68.878 | 1.00 | — | — |
| diaphragm | ∞ | 18.97–1.46 | — | — |
| 12 | 285.560 | 2.99 | 1.80100 | 35.0 |
| 13 | −105.285 | 6.08 | — | — |
| 14 | −95.905 | 1.50 | 1.88300 | 40.8 |
| 15 | 24.233 | 3.00 | 1.59270 | 35.3 |
| 16 | 70.244 | 6.75 | — | — |
| 17 | 39.358 | 3.20 | 1.60562 | 43.7 |
| 18 | 85.498 | — | — | — |

The numerical values of the expressions and intermediate values which are used to obtain the numerical values in the third embodiment are shown in Table 6 below.

TABLE 6

| | | f | 105 | 135 | |
|---|---|---|---|---|---|
| object at infinite | | $d_{a-b}$ | 12.79 | 19.06 | |
| | | $d_{F-R}$ | 19.97 | | |
| | | $f_B$ | 39.00 | 2.46 | |
| | | | | 80.68 | |
| object distance U = 0.36 m | | m | | | |
| | | $d_O$ | −0.661 | −1.109 | |
| | | | 200.50 | 156.91 | *** |
| | | $d_{a-b}$ | | | ** |
| | | $d_{F-R}$ | 12.79 | 19.06 | *** |
| | | | 55.40 | 51.04 | |
| | | $f_B$ | 39.00 | 80.68 | |
| | | ΔX | 35.40 | 48.60 | |

**designates figures which vary upon focusing
***designates figures which are constant upon focusing
$Z_O = 1.286$
$X_{F-a} = 30.4 = X_F$
$X_{F-b} = 24.1$
$X_R = 41.7$
$Z_X = 1.678$
$\Delta X_{max} = 48.6$
$f_{F-S} = 75.0$
$f_R = −117.3$
$f_{F-L} = 76.9$
$Z_X/Z_O = 1.305$
$\Delta X_{max}/f_{F-L} = 0.63$
$X_F/f_S = 0.29$
$X_{F-a}/X_{F-b} = 1.267$ <Embodiment 4>

Table 7 shows paraxial numerical data of a zoom lens shown in FIG. 3.

TABLE 7

| f | | 90 | 120 |
|---|---|---|---|
| object at infinite | $D_{F-R}$ | 12.18 | 0.84 |
| | $F_B$ | 103.27 | 121.21 |
| object distance | m | | |
| U = 0.23 m | $D_O$ | −0.725 | −1.081 |
| | | 41.6 | 28.4 |
| | $D_{F-R}$ | 61.21 | 62.35 |
| | $F_B$ | 103.27 | 121.21 |

$f_{F-S} = f_{F-L} = -82.64$
$f_R = 49.43$
distance between principle points; front lens group $HH_F = -1.6$
distance between principle points; rear lens group $HH_R = -14.9$
$Z_O = 1.333$
$X_F = 6.6$
$X_R = 17.9$
$Z_X = 1.491$
$\Delta X_{max} = 61.5$
$Z_X/Z_O = 1.119$
$|m_{R-S}| = 0.089$ ($m_{R-S} < 0$)
$\Delta X_{max}/|f_{F-L}| = 0.744$
$X_F/f_S = 0.073$
wherein
$D_O$; distance between an object and 1st principle point of the front lens group,
$D_{F-R}$; distance between 2nd principle point of the front lens group and 1st principle point of the rear lens group,
$F_B$; distance between 2nd principle point of the rear lens group and an image plane.

Table 8 shows the numerical values of the expressions (1) through (6) for the four embodiments mentioned above.

TABLE 8

| | embodiment 1 | embodiment 2 |
|---|---|---|
| formula(1) | 1.302 | 1.171 |
| formula(2) | 1.467 | 1.397 |
| formula(3) | 0.29 | 0.29 |
| formula(4) | 0.54 | 0.43 |
| formula(5) | — | 1.257 |
| formula(6) | 1.286 | 1.286 |
| | embodiment 3 | embodiment 4 |
| formula(1) | 1.305 | 1.119 |
| formula(2) | 1.400 | 1.089 |
| formula(3) | 0.29 | 0.073 |
| formula(4) | 0.63 | 0.744 |
| formula(5) | 1.267 | — |
| formula(6) | 1.286 | 1.333 |

As can be seen from Table 8, the first through fourth embodiments satisfy the requirements defined by formulae (1) through (6).

As may be understood from the above discussion, according to the present invention, a zoom lens in which the lateral magnification at the shortest object distance and at the long focal length extremity is remarkably larger than that of the conventional zoom lens and in which the zooming can be effected even in a macro range can be provided.

What is claimed is:

1. A zoom lens, comprising at least two lens groups of a front lens group and a rear lens group, in this order from an object side, wherein a zooming operation in which said front lens group and said rear lens group are relatively moved and a focusing operation in which at least one of said front and rear lens groups is moved can be carried out, and wherein, if a zoom ratio when the zooming operation from a short focal length extremity to a long focal length extremity is effected while keeping an in-focus condition for an object at a longest distance is $Z_o$, and a zoom ratio when the zooming operation from the short focal length extremity to the long focal length extremity is effected while keeping an in-focus condition for an object at a shortest distance is $Z_x$, respectively, the zoom lens satisfies the relationship defined by the following formula:

$$1.07 < Z_x/Z_o,$$

wherein:

$Z_x = m_L/m_S$ $Z_o = f_L/f_S$ $m_L$ equals a lateral magnification of the whole lens system at the long focal length extremity and at the shortest object distance, $m_s$ equals a lateral magnification of the whole lens system at the short focal length extremity and at the shortest object distance, $f_L$ equals a focal length of the whole lens system at the long focal length extremity and at the longest object distance, and $f_S$ equals a focal length of the whole lens system at the short focal length extremity and at the longest object distance.

2. A zoom lens according to claim 1, wherein the front lens group is moved toward the object side when the zooming operation from the long focal length extremity to the short focal length extremity is effected and satisfies the following formulae:

$$1.0 < |m_{R-S}|$$

$$0.05 < X_F/f_S$$

wherein $m_{R-S}$ equals a lateral magnification of the rear lens group at the longest object distance and at the short focal length extremity, and $X_F$ equals a total displacement of the front lens group upon zooming.

3. A zoom lens according to claim 2, wherein the front lens group forms a focusing lens which is moved toward the object side as the object distance reduces from a long distance to a short distance during the focusing operation, and satisfies the following formula:

$$0.25 < \Delta X_{max}/|f_{F-L}| < 1.0$$

wherein $\Delta X_{max}$ equals a maximum displacement of the front lens group during the focusing operation, and $f_{F-L}$ equals a focal length of the front lens group at the long focal length extremity.

4. A zoom lens, comprising at least two lens groups of a front lens group of a positive power and a rear lens group of a negative power, in this order from an object side, wherein both the front lens group and the rear lens group are moved toward the object side during a zooming operation from the long focal length extremity to the short focal length extremity, and the front lens group is moved toward the object side as the object distance is decreased from the long object distance to the short object distance during the focusing operation, and wherein the zoom lens satisfies the relationship defined by the following formulae:

$$1.1 < |m_{R-S}|$$

$$0.1 < X_F/f_S$$

$$0.25 < \Delta X_{max}/|f_{F-L}| < 1.0$$

wherein, $m_{R-S}$ equals a lateral magnification of the rear lens group at the longest object distance and at the short focal length extremity, $X_F$ equals a total displacement of the front lens group upon zooming, $f_S$ equals a focal length of the whole lens system at the short focal length extremity and at the longest object distance, $\Delta X_{max}$ equals a maximum displacement of the front lens group during the focusing operation, and $f_{F-L}$ equals a focal length of the front lens group at the long focal length extremity.

5. A zoom lens according to claim 4, wherein the front lens group comprises two sub lens groups of an F-a-th lens group and an F-b-th lens group in this order from the object side and satisfies the following formula:

$$1.1 < \Delta X_{F-a}/\Delta X_{F-b}$$

wherein $\Delta X_{F-a}$ equals a total displacement of the F-a-th lens group during the zooming operation, and $\Delta X_{F-b}$ equals a total displacement of the F-b-th lens group during the zooming operation.

6. A zoom lens, comprising at least two lens groups of a front lens group having a negative power and a rear lens group having a positive power, in this order from an object side, wherein both said front lens group and said rear lens group are moved toward the object side during a zooming operation from a long focal length extremity to a short focal length extremity, the front lens group being moved toward the object side as an object distance is decreased from the long object distance to the short object distance during a focusing operation, and wherein the zoom lens satisfies the relationship defined by the following formulae:

$$1.0 < |m_{R-S}|$$

$$0.05 < X_F/f_S$$

$$0.25 < \Delta X_{max}/|f_{F-L}| < 1.0$$

wherein, $m_{R-S}$ equals a lateral magnification of the rear lens group at the longest object distance and at the short focal length extremity, $X_F$ equals a total displacement of the front lens group upon zooming, $f_S$ equals a focal length of the whole lens system at the short focal length extremity and at the longest object distance, $\Delta X_{max}$ equals a maximum displacement of the front lens group during the focusing operation, and $f_{F-L}$ equals a focal length of the front lens group at the long focal length extremity.

7. A zoom lens according to claim 1, wherein the focusing operation is carried out by an automatic focusing system.

* * * * *